United States Patent Office 3,028,339
Patented Apr. 3, 1962

3,028,339
PROCESS OF PREPARING SULFIDE PHOSPHORS
Yoshiki Inoue, 41 Zenshoji-cho 1-Chome, Suma-ku, Kobe, Japan; Naohiko Fukuoka, 1320-29 Shinzaike-doinouchi, Aboshi-ku, Himeji, Japan; and Seiji Matsumoto, 259 Befucho-Nishiwaki, Kakogawa, Japan
No Drawing. Filed Feb. 15, 1960, Ser. No. 8,526
11 Claims. (Cl. 252—301.6)

This invention relates to a process of preparing sulfide phosphors.

The conventional processes of preparing sulfide phosphors have used, as a solvent, water which has a dielectric constant of 80. Each of such processes, however, is disadvantageous in that it is difficult to separate impurities from a produced precipitate and also to filter and wash the precipitate which, in turn comprises essentially a phosphor material because the solution used has a high dielectric constant resulting in a high solvation. Further, in order to prepare pure, uniform products, the practice of the conventional processes requires both rare technical skill and expensive equipment. Nevertheless their yields are very low. For those reasons, the sulfide phosphors presently available are of high cost.

The inventors have found that the above-mentioned difficulties can be avoided by using a solvent having a dielectric constant of less than 50. This results also in the facilitation of preparing sulfide phosphors with an improved yield.

Therefore, an important object of the invention is to provide a new, improved process of preparing sulfide phosphors.

The object is accomplished by the present invention directed to a process of preparing sulfide phosphors, which comprises dissolving a water-soluble salt of an element such as zinc or cadmium or a mixture of such salts in a solvent having a dielectric constant of less than 50, either passing through the solution hydrogen sulfide at atmospheric pressure or under pressurized condition, or reacting the same with a compound capable of reacting with said salt or salts to precipitate a sulfide or sulfides, thereafter mixing the precipitate with an activator or activators, and firing the mixture.

The invention will be more clearly understood as the description proceeds.

According to one feature of the invention, a highly purified water-soluble salt of zinc or cadmium or a mixture of such salts is dissolved in a solvent having a dielectric constant of less than 50.

The salts suitable for the use in the invention include inorganic salts of zinc or cadmium purified in any well-known manner. Typical inorganic salts include sulfates, chlorides and nitrates.

Examples of the solvents comprise alcohols, polyhydric alcohols, ketones, ethers, esters, organic acids, chloroform, nitriles, liquefied solvents such as ammonia or other inorganic material and the like.

If desired, an anion which is the same as that contained in the used salt i.e. a common anion may be added to the solution. Then purified hydrogen sulfide is passed through the solution thus produced to precipitate zinc sulfide or cadmium sulfide when a zinc salt or a cadmium salt is initially used respectively. Alternatively, if the initially used salt is a mixture of zinc and cadmium salts then a mixture of zinc and cadmium sulfides will be precipitated. Instead of hydrogen sulfide there may be used a solution of a sulfide such as sodium sulfide or ammonium sulfide dissolved in the solvent mentioned previously. The sulfide thus produced is a sulfide phosphor material. The term "sulfide phosphor material" used herein means substrate of objective sulfide phosphors.

The sulfide phosphor material is then mixed with an activator or activators selected from the group of elements consisting of copper, manganese, gold, silver, bismuth, tin, arsenic, lead, aluminum, chloride and mixtures thereof and a flux such as sodium chloride, potassium chloride, ammonium chloride, aluminum nitrate and potassium bromide, and then fired to complete the preparation of a desired phosphor having a high luminescent response to ultraviolet radiation, cathode ray and electric field.

The mechanism of reaction for producing the sulfide described above is not yet understood, but it has been found that the reaction of the invention is not greatly affected by the concentration of hydrogen ion present and rapidly proceeds with a high yield. It is well known that a reaction by which a sulfide is produced in an aqueous solution is greatly affected by the concentration of hydrogen ion present. Besides, the resulting reaction product according to the invention is relatively free from impurities because of the low dielectric constant of the solvent used, and can be easily filtered and washed resulting in a uniform precipitate. Further, the practice of the invention does not always require rare-technical skill nor expensive equipment.

According to another feature of the invention, a water-soluble salt or salts of the element or elements mentioned above may be dissolved, as an activator, in the solvent described previously, together with the starting sulfide or sulfides. Alternatively, the water-soluble salt or salts of the element or elements may be first dissolved in the said solvent and then added to the solution of the starting sulfide or sulfides. In either case, the use of a solvent having a dielectric constant of less than 50 facilitates greatly the separation of impurities, filtering and washing. In addition, the activator in the form of sulfide is uniformly distributed in the sulfide phosphor material and in intimate contact with the particles of the latter. Therefore, the firing operation is effected such that the activator will be rapidly diffused in he phosphor material. This makes it possible to eliminate the use of rare technical skill and expensive equipment required to uniformly mix an activator with a phosphor material and also to reduce its loss during the mixing operation. Accordingly it will be appreciated that the invention can provide inexpensive sulfide phosphors.

The following examples illustrate the practice of the invention.

*Example 1*

1 kilogram of crystalline zinc sulfate crystals

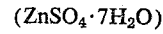

$$(ZnSO_4 \cdot 7H_2O)$$

which had been highly purified, was dissolved in 5 litres of pure methanol. Hydrogen sulfide was then passed through the solution for about 20 minutes, and the solution was filtered. The resulting deposited particles were substantially of a size and more loosely bound with the solvent as compared with the known case where water was used. Therefore, the solution was of low viscosity and it could be easily filtered. The filtered product was washed with pure methanol three or four times. The washed precipitate was dried at a temperature from 70° C. to 90° C. to obtain a zinc sulfide phosphor material. The yield was as high as 95%.

In order to prepare a desired phosphor, the phosphor material thus obtained was mixed with $10^{-3}$ mol percent of copper activator and sodium chloride flux and then fired at a temperature of 1200° C. for one hour. This yielded an excellent phosphor which can emit green light in response to ultraviolet radiation.

Example 2

1 kilogram of refined cadmium nitrate was dissolved in 10 litres of pure methanol. The solution was processed in the manner described in Example 1. The resulting sulfide phosphor material was yellowish orange and somewhat more reddish than that obtained when water was used as a solvent with other conditions identical. The yield was 98%.

Cadmium sulfide thus obtained was admixed with a phosphor material of zinc sulfide prepared as described in Example 1 substantially in the same proportions, and then $10^{-2}$ mol percent of silver activator and potassium chloride flux was added to the mixture followed by firing at a temperature of 1000° C. for one hour. The resulting phosphor emitted a light of yellow color by the bombardment of cathode ray on the same.

Example 3

A zinc sulfide phosphor material prepared according to Example 1 was admixed with $10^{-2}$ mol percent copper chloride and $10^{-3}$ mol percent of lead as activator and then fired at 800° C. for one hour. The resulting phosphor emitted greenish blue light under the influence of an alternating electric field.

Example 4

1 kilogram of thoroughly purified crystalline zinc chloride ($ZnCl_2$) was dissolved in 5 litres of ethanol. Hydrogen sulfide was passed through the solution for about 20 minutes, and then the solution was filtered. The precipitate thus obtained consisted of uniform particles which were more loosely bound as compared with the case where water was used as a solvent. Therefore, the solution had a low viscosity resulting in facilitation of filtration. The deposit was washed with pure ethanol, and dried at from 70° C. to 90° C. to provide a zinc sulfide phosphor material. The yield was 93%.

Zinc sulfide thus obtained was mixed with $10^{-3}$ mol percent of copper activator and sodium chloride flux followed by firing at 1000° C. The fired product emitted green light in response to ultraviolet radiation.

Example 5

1 kilogram of thoroughly purified crystalline zinc nitrate ($Zn(NO_3)_2 \cdot 6H_2O$) was dissolved in 5 litres of acetone. Hydrogen sulfide was passed through this solution for about 20 minutes, and then the solution was filtered. The precipitate thus obtained also consisted of uniform particles and the solution could be easily filtered as in Example 4. The filtered precipitate was washed with pure acetone and dried at from 70° C. to 90° C. to produce zinc sulfide phosphor material. The yield was 95%. $10^{-3}$ mol percent of silver activator and barium chloride flux were added to the material, and the mixture was fired at from 800° C. to 1200° C. There was obtained an excellent phosphor capable of emitting green light under the influence of ultraviolet radiation.

Example 6

1 kilogram of thoroughly purified, crystalline cadmium nitrate ($Cd(NO_3)_2 \cdot 4H_2O$) was dissolved in 5 litres of pure isopropyl alcohol. The solution was treated in the manner described in Example 5 except that isopropyl alcohol was used as a washing agent. Thus a cadmium sulfide phosphor material was obtained with the yield of 95%. $10^{-3}$ mol percent of copper activator and magnesium chloride flux were mixed with the material thus obtained and the mixture was fired at from 800° C. to 1200° C. Thus an excellent phosphor capable of emitting green light in response to ultraviolet radiation was produced.

Example 7

1 kilogram of thoroughly purified crystalline zinc chloride ($ZnCl_2$) was dissolved in 5 litres of ether. The solution was treated as in Example 6 excepting that the deposited zinc sulfide was washed with ether. The yield was 95%. The resulting phosphor emitted green light in response to ultraviolet radiation.

Example 8

1 kilogram of zinc nitrate was dissolved in 10 litres of methanol, and then 0.75 gram of copper nitrate and 0.85 gram of lead nitrate were added to the solution. Hydrogen sulfide was passed through the resulting solution. Zinc and lead nitrates were first converted into zinc and lead sulfides and zinc was almost simultaneously deposited as zinc sulfide resulting in a zinc sulfide phosphor material intimately mixed with activators. The mixture was washed with methanol and then dried. The dried mixture was fired at 950° C. for one hour to produce an electroluminescent phosphor responsive to an alternating electric field.

Example 9

540 grams of zinc nitrate and 460 grams of cadmium nitrate were dissolved in 10 litres of methanol. Hydrogen sulfide was passed through the solution to produce a mixture of zinc sulfide and cadmium sulfide. $10^{-2}$ mol percent of silver activator and sodium chloride flux were added to the mixture and then fired at 950° C. for one hour. The final product was a phosphor capable of emitting yellow light in response to cathode rays.

Example 10

Zinc sulfate was dissolved again into the filtrate (which was methanol solution including sulfuric acid produced by the decomposition of zinc sulfate) produced during the step of obtaining zinc sulfide described in Example 1. Hydrogen sulfide was again passed through the solution. The sulfide particles were produced at a low rate and were of a larger size, whereby filtration and washing were particularly well performed.

Example 11

1 kilogram of zinc sulfate was dissolved in 5 litres of methanol. 250 grams of ammonium acetate was separately dissolved in 5 litres of methanol. Hydrogen sulfide was passed through the mixture of the two solutions, whereby zinc sulfide was produced with sulfuric acid produced by dissociation. The latter was reacted with ammonium acetate, thereby to liberate acetic acid. Acetic acid served to control the concentration of hydrogen ion and to facilitate the reaction so that the yield of zinc sulfide approached a theoretical value. Zinc sulfide thus obtained was washed, dried and mixed with 5 percent by weight of $10^{-5}$ mol copper activator followed by firing at 1200° C. for two hours. The resulting phosphor had a long afterglow and could emit green light in response to ultraviolet radiation.

What we claim is:

1. A process of preparing zinc sulfide and cadmium sulfide phosphor which comprises dissolving at least one member of the group consisting of zinc and cadmium salts of strong inorganic acids selected from the group consisting of sulfuric acid, nitric acid and hydrochloric acid in a solvent having a dielectric constant of less than 50 together with at least one water-soluble activator salt, adding a member of the group consisting of sodium sulfide and ammonium sulfide to the solution at a temperature below the boiling point of said solution to precipitate at least one corresponding sulfide intimately mixed with the corresponding activator sulfide, drying the precipitate thus obtained, and firing the dried precipitate.

2. A process of preparing zinc sulfide and cadmium sulfide phosphor which comprises dissolving at least one member of the group consisting of zinc and cadmium salts of strong inorganic acids selected from the group consisting of sulfuric acid, nitric acid and hydrochloric acid in a solvent having a dielectric constant of less than 50, passing hydrogen sulfide through the resultant solution at a temperature below the boiling point of said solution to precipitate at least one corresponding sulfide, drying the precipitate thus produced, mixing the dried precipitate with at least one activator, and firing the mixture thus produced.

3. A process of preparing zinc sulfide and cadmium sulfide phosphor which comprises dissolving at least one member of the group consisting of zinc and cadmium salts of strong inorganic acids selected from the group consisting of sulfuric acid, nitric acid and hydrochloric acid in a solvent having a dielectric constant of less than 50, adding to the resultant solution at a temperature below the boiling point of said solution at least one member of the group consisting of hydrogen sulfide, sodium sulfide and ammonium sulfide to precipitate at least one corresponding sulfide, drying the precipitate thus produced, mixing the dried precipitate with at least one activator, and firing the mixture thus produced.

4. A process of preparing zinc sulfide and cadmium sulfide phosphor which comprises dissolving at least one member of the group consisting of zinc and cadmium salts of strong inorganic acids selected from the group consisting of sulfuric acid, nitric acid and hydrochloric acid in a solvent having a dielectric constant of less than 50 together with at least one water-soluble activator salt, adding a member of the group consisting of hydrogen sulfide, sodium sulfide and ammonium sulfide to the solution at a temperature below the boiling point of said solution to precipitate at least one corresponding sulfide intimately mixed with the corresponding activator sulfide, drying the precipitate thus obtained, and firing the dried precipitate.

5. A process as defined in claim 2, wherein said solvent is selected from the group consisting of alcohols, polyhydric alcohols, ketones, ethers, esters, organic acids, chloroform, nitriles, and liquefied inorganic compounds, each having a dielectric constant of less than 50.

6. A process as defined in claim 3, wherein said solvent is selected from the group consisting of alcohols, polyhydric alcohols, ketones, ethers, esters, organic acids, chloroform, nitriles, and liquefied inorganic compounds, each having a dielectric constant of less than 50.

7. A process as defined in claim 4, wherein said solvent is selected from the group consisting of alcohols, polyhydric alcohols, ketones, ethers, esters, organic acids, chloroform, nitriles, and liquefied organic compounds, each having a dielectric constant of less than 50.

8. A process as defined in claim 2, wherein the activator used is at least one member of the group consisting of copper, manganese, gold, silver, bismuth, tin, antimony, arsenic, lead, aluminum and halogens.

9. A process as defined in claim 3, wherein the activators used involve at least one member selected from the group consisting of copper, manganese, gold, silver, bismuth, tin, antimony, arsenic, lead, aluminum and halogens.

10. A process as defined in claim 4, wherein the activator is at least one member of the group consisting of compounds of copper, silver, manganese, lead, bismuth, tin, antimony, arsenic, aluminum, and halogen.

11. A process of preparing zinc sulfide and cadmium sulfide phosphor which comprises dissolving at least one member of the group consisting of zinc and cadmium salts of strong inorganic acids selected from the group consisting of sulfuric acid, nitric acid and hydrochloric acid in a solvent having a dielectric constant of less than 50 and selected from the group consisting of alcohols, polyhydric alcohols, ketones, ethers, esters, organic acids, chloroform, nitriles, and liquefied inorganic compounds, adding to the resultant solution at a temperature below the boiling point of said solution, at least one member of the group consisting of hydrogen sulfide, sodium sulfide and ammonium sulfide, and adding ammonium acetate as a pH controller, to form at least one corresponding sulfide, drying the precipitate thus obtained, mixing the dried precipitate with at least one activator selected from the group consisting of copper, manganese, gold, silver, bismuth, tin, antimony, arsenic, lead, aluminum and halogens, and firing the resultant mixture.

References Cited in the file of this patent

UNITED STATES PATENTS

| | | |
|---|---|---|
| 2,734,872 | Young | Feb. 14, 1956 |
| 2,782,168 | Fetters | Feb. 19, 1957 |
| 2,805,917 | Nitsche | Sept. 10, 1957 |